US010612704B2

(12) United States Patent
Simoner

(10) Patent No.: US 10,612,704 B2
(45) Date of Patent: Apr. 7, 2020

(54) PIPE COUPLING

(71) Applicant: HOBAS Pipes International GmbH, Klagenfurt (AT)

(72) Inventor: Thomas Simoner, Maria Saal (AT)

(73) Assignee: HOBAS Pipes International GmbH, Klagenfurt (AT)

( * ) Notice: Subject to any disclaimer, the term of this patent is extended or adjusted under 35 U.S.C. 154(b) by 424 days.

(21) Appl. No.: 15/323,842

(22) PCT Filed: Jun. 9, 2015

(86) PCT No.: PCT/EP2015/062803
§ 371 (c)(1),
(2) Date: Jan. 4, 2017

(87) PCT Pub. No.: WO2016/005128
PCT Pub. Date: Jan. 14, 2016

(65) Prior Publication Data
US 2017/0146164 A1 May 25, 2017

(30) Foreign Application Priority Data
Jul. 11, 2014 (DE) .................. 10 2014 109 799

(51) Int. Cl.
| F16L 21/02 | (2006.01) |
| F16L 1/036 | (2006.01) |
| E21B 7/20 | (2006.01) |
| F16N 21/00 | (2006.01) |
| F16L 57/06 | (2006.01) |

(52) U.S. Cl.
CPC .............. *F16L 21/022* (2013.01); *E21B 7/20* (2013.01); *F16L 1/036* (2013.01); *F16N 21/00* (2013.01); *F16L 57/06* (2013.01)

(58) Field of Classification Search
CPC ......... F16L 21/022; F16L 1/036; F16L 57/06; F16N 21/00; E21B 7/20
USPC .................................................... 285/94, 417
See application file for complete search history.

(56) References Cited

U.S. PATENT DOCUMENTS

| 1,633,798 | A | | 6/1927 | Taylor ........................... 285/330 |
| 3,565,213 | A | * | 2/1971 | Heller |
| 3,582,112 | A | * | 6/1971 | Pico ...................... F16L 21/022 |
| 3,829,136 | A | | 8/1974 | Eidelberg ...................... 285/383 |
| 4,153,656 | A | | 5/1979 | Bunyan ........................ 264/40.1 |
| 4,174,125 | A | | 11/1979 | Wyss ............................. 285/110 |

(Continued)

FOREIGN PATENT DOCUMENTS

| DE | 2015 341 | 10/1970 | .............. F16L 21/02 |
| DE | 27 44 739 A1 | 4/1978 | .............. F16L 21/02 |

(Continued)

OTHER PUBLICATIONS

International Search Report from corresponding International Patent Application No. PCT/EP2015/062803, dated Sep. 17, 2015.

*Primary Examiner* — Zachary T Dragicevich
(74) *Attorney, Agent, or Firm* — Kusner & Jaffe

(57) ABSTRACT

A pipe coupling for connecting two pipes, wherein the pipe coupling comprises at least one injection outlet for injecting lubricant. The invention further relates to a method, which is designed to be connected to a further pipe by way of such a pipe coupling, to a pipe union, to a method for injecting lubricant, and to a method for producing a pipe coupling.

12 Claims, 4 Drawing Sheets

(56) References Cited

U.S. PATENT DOCUMENTS

| | | | | |
|---|---|---|---|---|
| 4,865,359 A | * | 9/1989 | Roberts | 285/94 |
| 4,961,598 A | * | 10/1990 | Sundholm | 285/94 |
| 5,527,135 A | * | 6/1996 | Hayashi | E21B 7/20 |
| 5,560,655 A | * | 10/1996 | Cameron | 285/94 X |
| 6,554,325 B1 | | 4/2003 | Knauder | 285/369 |
| 2014/0124050 A1 | * | 5/2014 | Tix | |

FOREIGN PATENT DOCUMENTS

| | | | |
|---|---|---|---|
| DE | 27 06 649 A1 | 8/1978 | F16L 21/02 |
| EP | 1 102 943 | 5/2001 | F16L 21/02 |
| GB | 1182856 | 3/1970 | F16L 51/00 |
| GB | 1293371 | 10/1972 | F16L 13/10 |
| GB | 2478665 A | 9/2011 | F16L 37/14 |
| WO | WO 2008/136761 A1 | 11/2008 | F16L 1/00 |

* cited by examiner

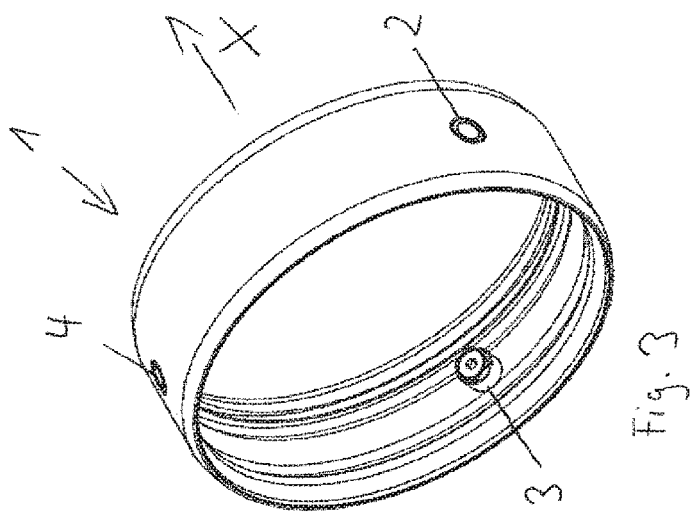
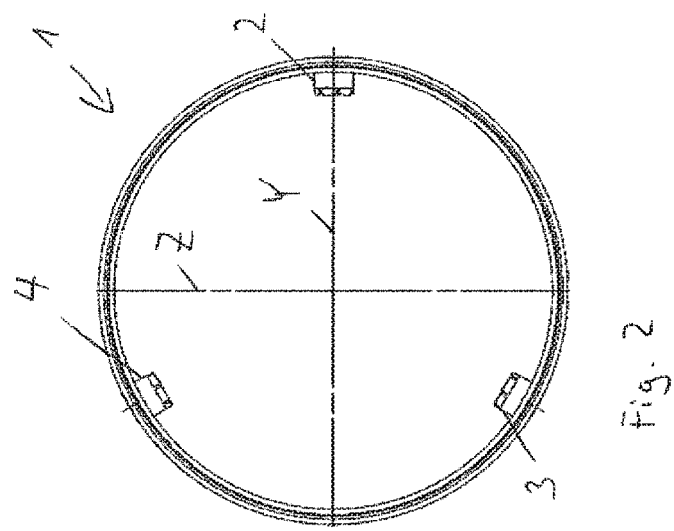
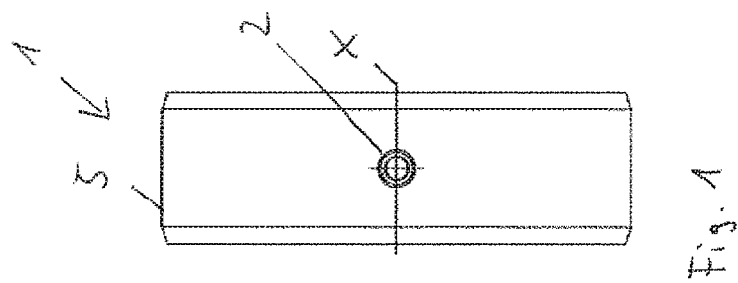

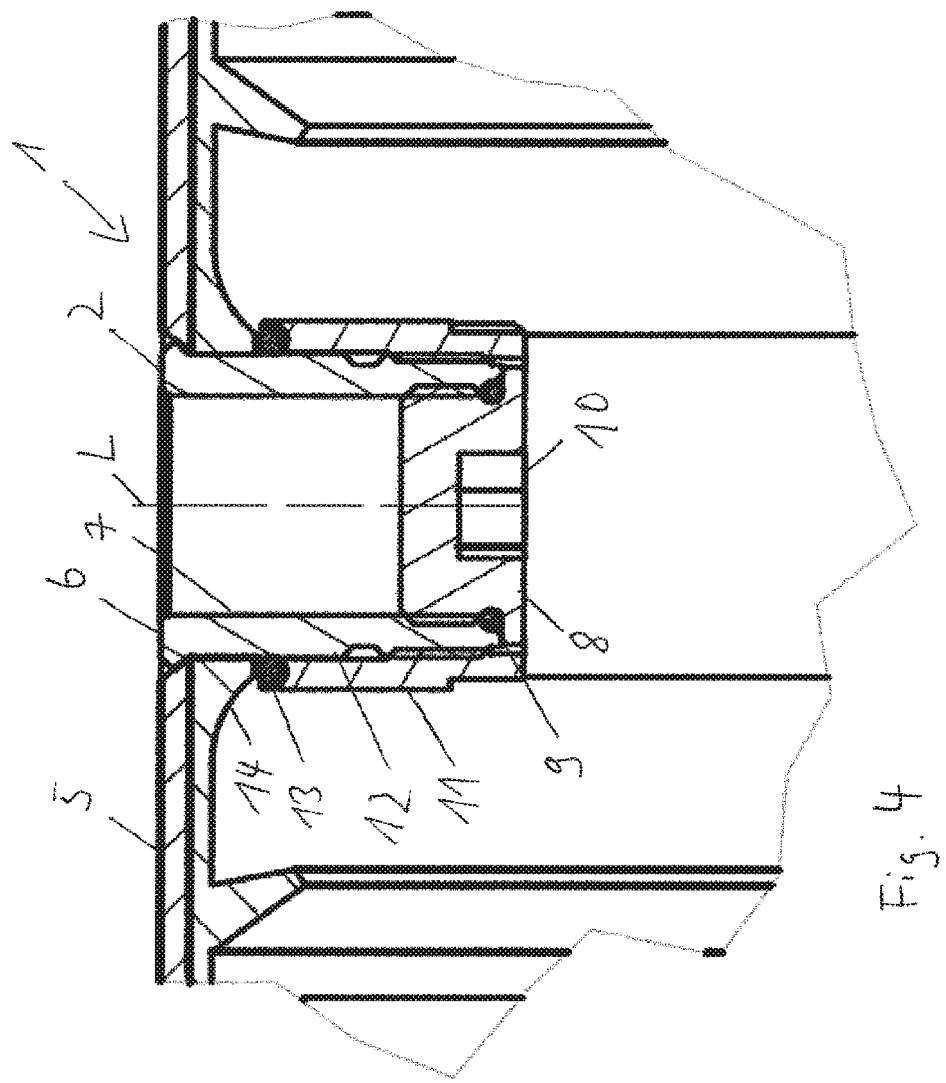

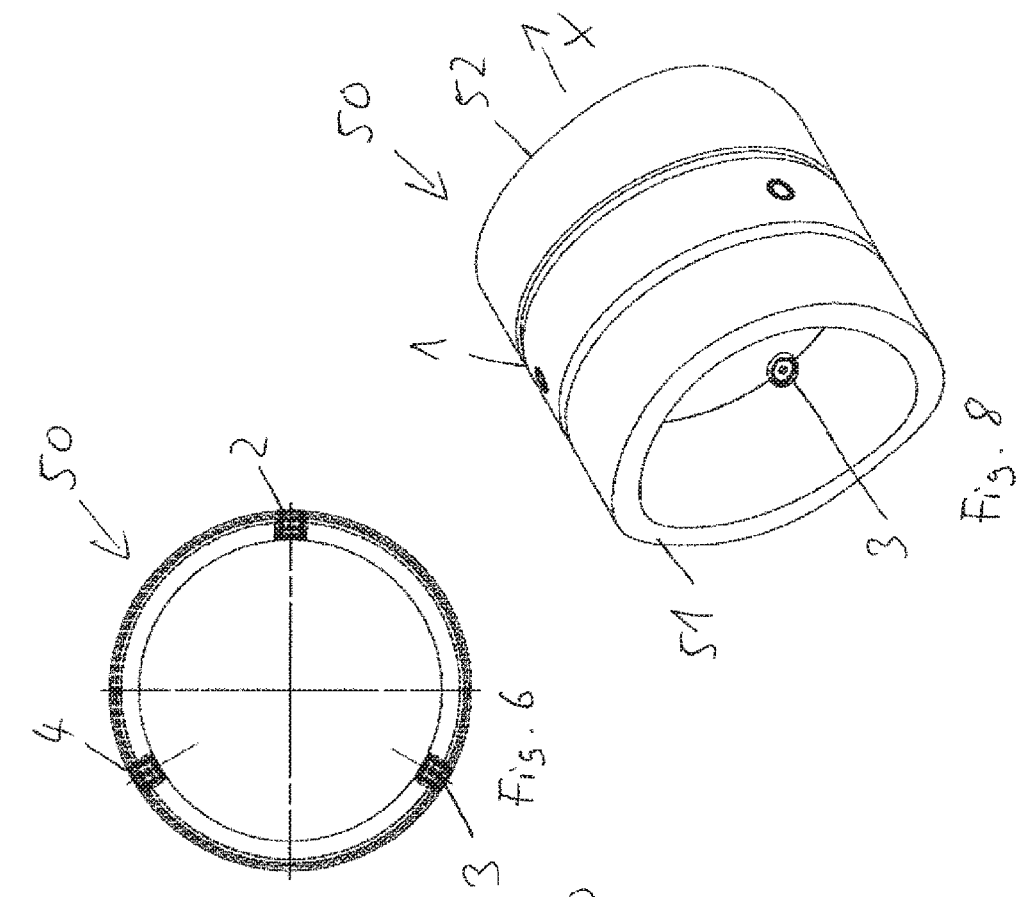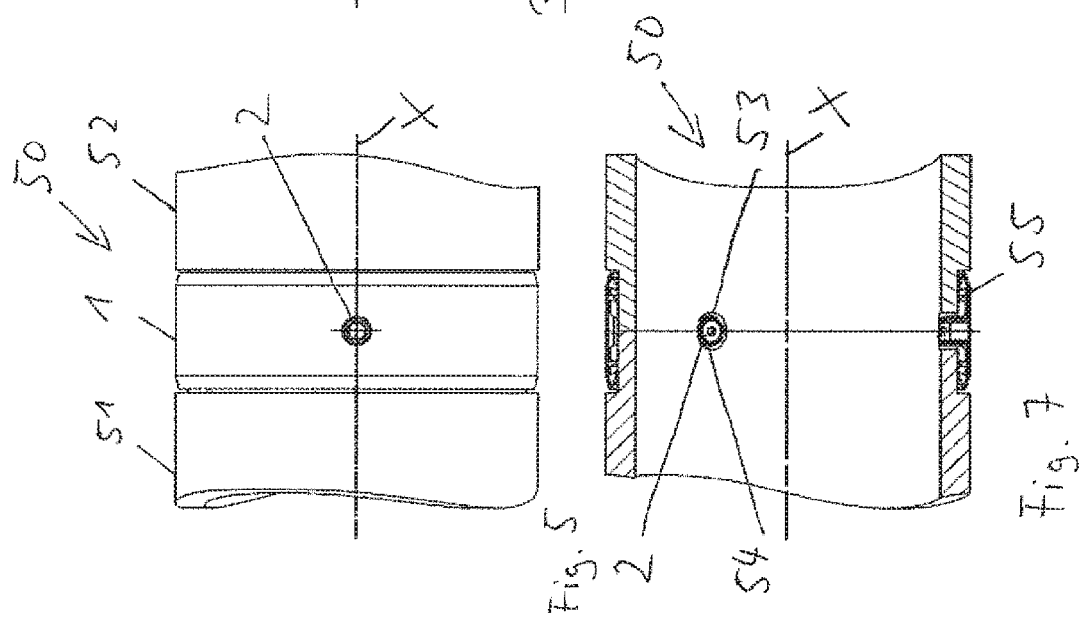

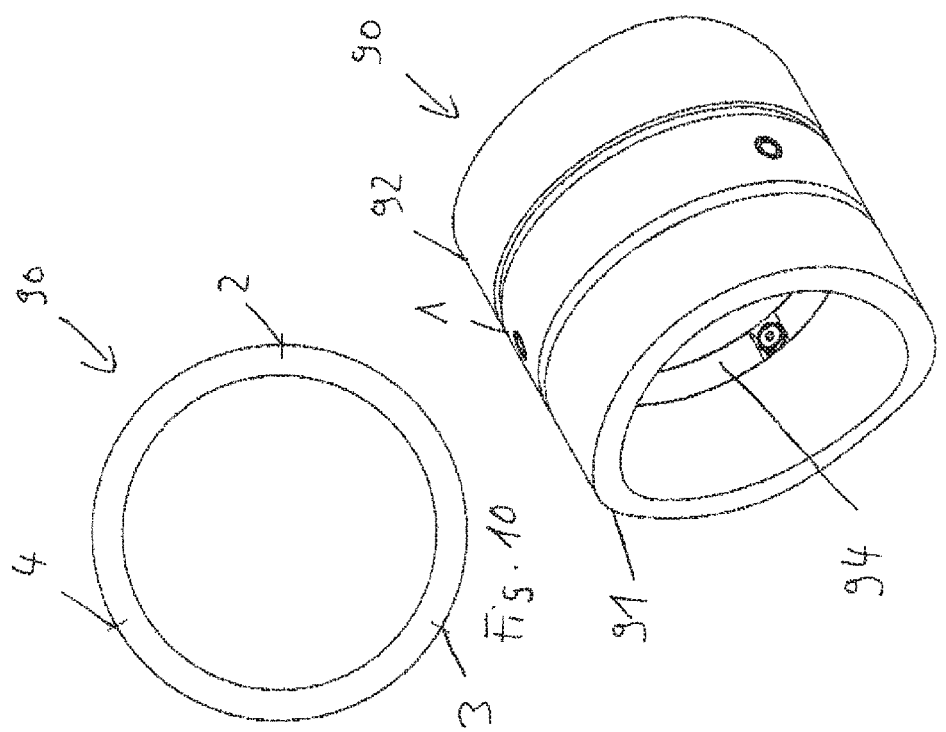
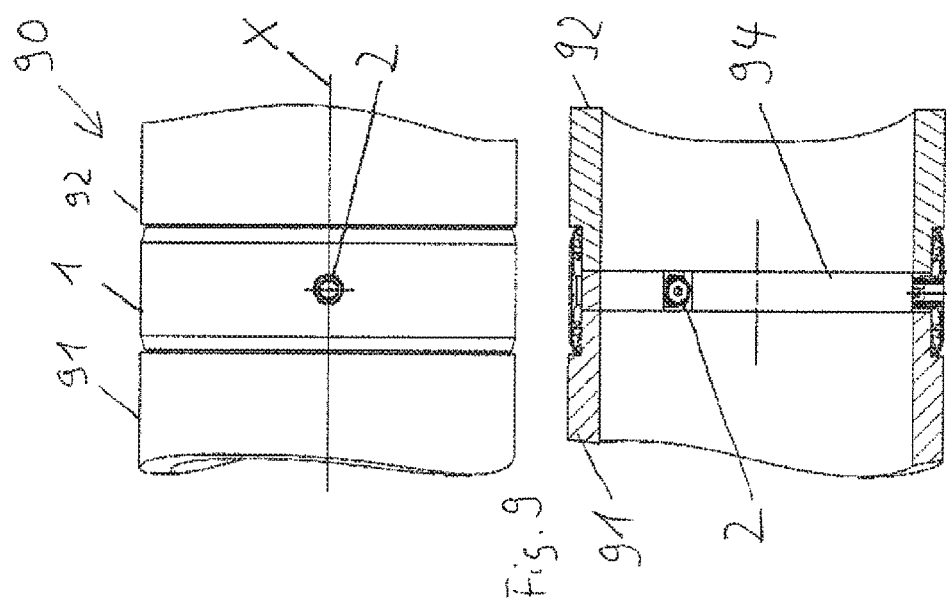

PIPE COUPLING

FIELD OF THE INVENTION

The present invention relates to a pipe coupling for connecting two pipes according to the preamble of claim 1. The invention further relates to a pipe, designed to be connected to a further pipe by way of a pipe coupling, to a pipe union, to a method for introducing lubricant, and to a method for producing a pipe coupling.

BACKGROUND OF THE INVENTION

Pipe couplings are described in DE 27 44 739 A1, U.S. Pat. No. 4,174,125 A and EP 1 102 943 B1, for example, wherein reference is made to the aforementioned published prior art with respect to the basic composition of a pipe coupling and the use thereof.

Usually a lubricant, such as bentonite, is applied to the outside wall of the pipes for pipe jacking so that the pipes can be pushed better into a tunnel or the like. To this end, an opening is introduced into the wall of the pipe, through which the lubricant can be injected onto the outer wall of the pipes from inside the pipes. This opening in the wall, however, has the disadvantage of weakening the structure of the pipe, whereby considerable stability and strength problems, in particular with respect to the internal pressure during operation of the pipe, can occur.

SUMMARY OF THE INVENTION

It is therefore the object of the present invention to provide a pipe coupling, a pipe, designed to be connected to a further pipe by way of a pipe coupling, a pipe union, a method for introducing lubricant, and a method for producing a pipe coupling, which eliminate the drawbacks of the related art, and which in particular enable improved stability and strength of the pipes, in particular with respect to the internal pressure during operation.

This object is achieved by the pipe, the pipe union, the method for introducing lubricant, and the method for producing a pipe coupling according to the independent claim(s). Advantageous embodiments and refinements of the invention can be derived from the dependent claims and the description with reference to the drawings.

The scope of the invention also covers all combinations of at least two features provided in the description, the claims and/or the figures. If value ranges are provided, the values within the cited tolerances listed shall also be considered disclosed as threshold values and are claimed in any arbitrary combination.

The basic idea of the present invention is that the at least one injection outlet is disposed, preferably directly, in the pipe coupling itself and does not have to be introduced into the wall of the pipes. As a result, no opening for the at least one injection outlet must be introduced into the pipes themselves. The walls of the pipes are thus not impaired, so that the structure thereof can be maintained or does not have to be additionally reinforced, which may result in oversized dimensioning. The strength and stability of the pipes are thus comparatively high, so that the pipes can withstand even high loads, and in particular have a high pressure resistance during operation. In this way, it can also be achieved that the walls of the pipes can be kept comparatively thin, and the diameters of the pipes can be designed comparatively small.

The lubricant is designed so as to allow jacking of the pipes, and in particular, the lubricant is bentonite. The lubricant reduces friction between the pipe and the soil. In addition to protecting the pipe wall, a lower jacking force is thus achievable or necessary for jacking. The lubricant is injected through the at least one injection outlet such that the same can be applied to the pipe coupling and/or the pipes and allows the pipe coupling and/or the pipes to be driven (jacked) into the pit or the like.

The pipe coupling and the pipes comprise walls that, in particular, can have a circular ring-shaped cross-section. In particular, the pipe coupling and/or the pipes are essentially designed as hollow circular cylinders. The walls each have an inner side and an outer side. In particular, the pipe coupling can end flush with the pipe.

It is preferred for the at least one injection outlet to apply the lubricant to the outer side of the wall of the pipe coupling and/or of the pipes, so that particularly good sliding properties can be achieved and the required jacking force can be reduced.

The pipes are, in principle, any type of pipe, and in particular waste water pipes and/or drinking water pipes, having a diameter of more than 2 m, more than 3 m, more than 4 m, more than 5 m or more than 6 m. The pipes are preferably made of GFRP, whereby particularly good strength can be achieved, in particular at a lower weight and/or a smaller pipe outside diameter.

It is preferred for the at least one injection outlet on the inner side of the wall of the pipe coupling to be connected to a lubricant supply system. In this case, the lubricant flows from the inside to the outside (from the inner side of the wall to the outer side of the wall of the pipe coupling) through the at least one injection outlet and exits the at least one injection outlet on the outer side of the wall of the pipe coupling. It then exits the injection outlet on the outer wall of the pipe coupling. Beginning in the starting pit of a jacking station, the lubricant is preferably transported in a hose line to the particular pipe coupling or to the particular injection outlet.

The pipe coupling can in particular be designed so as to be tubular, in other words annular, and to extend along the longitudinal axis thereof, wherein the pipe coupling can in particular be designed so as to be rotation-symmetrical to the longitudinal axis thereof. It comprises a first end face having a first end surface and a second end face having a second end surface, wherein in particular the first end surface is disposed parallel to the second end surface. With the first side, the pipe coupling receives a first pipe, and with the second side, the pipe coupling receives a second pipe. The pipes are fixedly and sealingly connected to the pipe coupling by way of suitable connecting means known from the related art.

The pipe coupling is made of a sufficiently strong material so as to absorb the loads. The pipe coupling can in particular be made of glass-fiber reinforced plastic (GFRP). Preferably it is provided that the pipe coupling is made of steel, and in particular stainless steel.

The pipe coupling comprises at least one injection outlet. The pipe coupling preferably comprises at least two injection outlets, and particularly preferably the pipe coupling comprises at least three injection outlets. If multiple injection outlets are present, advantageously a better distribution of the lubricant can take place.

The at least one injection outlet extends in particular along a longitudinal axis and is preferably designed, at least partially, rotation-symmetrically to the longitudinal axis thereof. The at least one injection outlet has an inlet opening for introducing the lubricant and an outlet opening for discharging the lubricant. The inlet opening is preferably disposed on the inner side of the wall of the pipe coupling.

The at least one injection outlet is designed in such a way that a lubricant supply system can be connected to the inlet opening. Coming from the lubricant supply system, the lubricant flows through the inlet opening into the injection outlet. The lubricant flows through a flow pipe, which preferably is designed as a hollow circular cylinder, of the injection outlet and exits the at least one injection outlet at the outlet opening, which is preferably located on the outer side of the wall of the pipe coupling and particularly preferably ends flush with the outer side of the wall.

It is preferred for the at least one injection outlet to comprise, at least regionally, an internal thread, into which, for example, a closure piece and/or a supply line of the lubricant supply system can be screwed.

According to a preferred refinement, it is provided that the at least one injection outlet is disposed in the wall of the pipe coupling, in particular centrally in relation to the longitudinal axis of the pipe coupling. This advantageously allows a particularly good distribution of the lubricant to take place.

According to another preferred refinement, it is provided that the at least one injection outlet is sealingly introduced, and in particular sealingly welded and/or sealingly laminated, into an opening in the wall of the pipe coupling. The sealing advantageously achieves that the lubricant cannot penetrate into the interior of the pipe coupling. In particular, welding is suitable if the pipe coupling is made of a metal, such as steel, and in particular stainless steel. In particular, laminating is suitable if the pipe coupling is made of a plastic material, such as GFRP.

According to another preferred refinement, it is provided that the at least one injection outlet ends flush with the outer side of the wall of the pipe coupling. In this way, it is advantageously possible to prevent the at least one injection outlet from impairing the forward motion during jacking of the pipe coupling.

According to another preferred refinement, it is provided that the at least one injection outlet comprises a closure piece for closing the opening of the injection outlet, which can be removed for injecting the lubricant so as to expose the opening of the injection outlet. The closure piece advantageously can achieve that the lubricant cannot find its way from the outside into the interior of the pipe coupling. Moreover, the closure piece ensures during later operation that the pipe is sealed, in particular in the case of pressure applications. The closure piece can preferably be equipped with a screw thread, and in particular with an external thread, so as be able to be screwed into the opening of the injection outlet for closing and unscrewed from the opening for opening. To this end, the opening can particularly preferably comprise an internal thread, which is designed to be screwed into the closure piece. This screw connection advantageously enables particularly simple handling of the injection outlet for injecting the lubricant. It is furthermore preferably provided that the closure piece comprises a recess at the end face, preferably having a hexagonal configuration, which is designed to receive a tool, such as a hexagon wrench, for loosening and/or fastening the closure piece.

According to another preferred refinement, it is provided that the longitudinal axis of the at least one injection outlet extends perpendicularly to the adjacent region of the wall of the pipe coupling. This advantageously makes it not only particularly easy to attach the at least one injection outlet to the wall, but also makes it particularly easy to connect the lubricant supply system.

According to another preferred refinement, it is provided that the at least one injection outlet comprises at least one sealing means, which seals the interior of the at least one injection outlet from the interior of the pipe coupling. In this way, it is advantageously possible to achieve that the lubricant cannot find its way into the interior of the pipe coupling. The at least one sealing means can preferably be designed as a sealing ring, in particular made of a rubber material, which is disposed in the region of the inlet opening of the injection outlet, and particularly preferably cooperates in a sealing manner with the closure piece.

According to another preferred refinement, it is provided that the at least one injection outlet comprises an external thread at least in regions. For example, another sealing means and/or the lubricant supply system can be screwed onto this external thread. Particularly preferably, it is provided that the external thread is disposed on the outer side of the flow pipe.

It is particularly preferred for the at least one injection outlet to comprise a nut, which is preferably provided with a hexagonal head at least in regions and which is designed in such a way that the nut can be screwed onto the external thread of the at least one injection outlet. It is furthermore preferred for the nut to cooperate with a further sealing ring in such a way that the space between the nut and the flow pipe can be sealed. Particularly preferably, it is provided that the nut cooperates with the further sealing ring in such a way that the space between the nut and the inner side of the wall of the pipe coupling can be sealed. For this purpose, the pipe coupling can comprise a corresponding, in particular circular, protruding region on the inner side of the wall, this region sealingly cooperating with the further sealing ring of the nut.

According to another preferred refinement, it is provided that the pipe coupling has two or more, and preferably three or more, injection outlets, which are distributed across the circumference of the pipe coupling spaced equidistantly apart from one another. In this way, advantageously a particularly good distribution of the lubricant is possible.

The present invention further relates to a pipe, designed to be connected to a further pipe by way of a pipe coupling according to any one of the preceding embodiments. In addition, reference is made to the comments regarding the pipe coupling.

In particular, it is preferred for the pipe to have at least one recess at the end face, which is designed so as to receive the at least one injection outlet of the pipe coupling at least partially. It is thus advantageously possible to fasten the pipe optimally to the pipe coupling. Furthermore, this allows the two pipes to be able to make contact at the end faces when connected by receiving the at least one injection outlet between one another in the at least one recess. It is furthermore preferred for the pipe to have the same number of recesses at the end face as injection outlets are present on the pipe coupling. In a preferred embodiment, the at least one recess has a semi-circular shape. It is then advantageously possible, for example, to receive a circular cylindrical injection outlet at least partially.

In an alternative embodiment, the pipe does not have a recess at the end face for receiving the at least one injection outlet. Instead, the pipe coupling comprises an insert ring, which is disposed inside the pipe coupling, and in particular in the center of the pipe coupling, between the end faces of the pipes, wherein the pipes connect to the insert ring at the end faces from both sides. The at least one injection outlet is disposed at least partially in the insert ring. In particular, the end faces of the pipes abut or make contact with the two end faces of the insert ring. Toward the inside, the insert ring ends flush with the inner walls of the pipes. The insert ring has the advantage that no recesses must be introduced into the pipes.

The present invention further relates to a pipe union, comprising a first pipe and a second pipe, in particular according to any one of the above-described embodiments, wherein the first pipe is connected to the second pipe by way of a pipe coupling according to any one of the above-described embodiments. In addition, reference is made to the above comments regarding the pipe coupling and the pipe.

The present invention moreover relates to a method for injecting lubricant onto a pipe, which is connected to a pipe coupling according to any one of the preceding embodiments, wherein the lubricant is injected (applied) onto the pipe through the injection outlet present in the pipe coupling. In addition, reference is made to the comments above. The lubricant is preferably applied through the injection outlet onto the outer side of the wall of the pipe.

The present invention moreover relates to a method for producing a pipe coupling according to any one of the above-described embodiments, wherein at least one opening is introduced into the wall of the pipe coupling and thereafter the at least one injection outlet is sealingly fastened in the opening. It is preferred that the at least one injection outlet is sealingly fixed in the opening by welding and/or is sealingly laminated into the opening. In addition, reference is made to the comments above.

Further exemplary embodiments of the present invention are shown in the drawings and will be described in more detail in the following description.

BRIEF DESCRIPTION OF THE DRAWINGS

In the drawings:

FIGS. 1 to 4 schematically show a pipe coupling according to an exemplary embodiment of the present invention:

FIGS. 5 to 8 schematically show a pipe union according to an exemplary embodiment of the present invention; and FIGS. 9 to 12 schematically show a pipe union according to a further exemplary embodiment of the present invention.

DETAILED DESCRIPTION OF THE INVENTION

In the various figures, identical parts are always denoted by the same reference numerals and therefore are generally only cited or mentioned once.

FIGS. 1 to 4 schematically show a pipe coupling 1 according to an exemplary embodiment of the present invention. FIG. 1 shows a side view of the pipe coupling 1. FIG. 2 shows a top view onto the pipe coupling 1. FIG. 3 shows a perspective view of the pipe coupling 1. FIG. 4 shows an enlarged detail of the pipe coupling 1.

The pipe coupling 1 can be made of steel, in particular stainless steel, or GFRP. The pipe coupling 1 has a circular ring shape and extends along the longitudinal axis X thereof, the lateral direction Y perpendicular to the longitudinal axis X, and the vertical direction Z perpendicular to the longitudinal axis X and to the lateral direction Y. In the present embodiment, the pipe coupling 1 has three injection outlets 2, 3, 4. The pipe coupling 1 accordingly has three openings in the wall 5 thereof, in which the injection outlets 2, 3, 4 are fastened, such as by way of welding and/or laminating.

The injection outlets 2, 3, 4 are distributed across the circumference of the pipe coupling 1 spaced equidistantly from one another. The pipe coupling 1 is designed rotation-symmetrically to the longitudinal axis X thereof at least in regions. As can be seen in the enlarged sectional view in FIG. 4, the injection outlet 2 comprises a flow pipe 6, which is sealingly connected to the wall 5 by way of welding and/or laminating. The longitudinal axis L of the flow pipe 6 extends perpendicularly to the surface of the wall 5. The flow pipe 6 is designed as a hollow cylinder and rotation-symmetrically to the longitudinal axis L thereof. The flow pipe 6 ends flush with the outer surface (outer side) of the wall 5. A through-passage, through which a lubricant can flow during operation, extends continuously through the flow pipe 6 along the longitudinal axis L.

In the present exemplary embodiment, the flow pipe 6 comprises an internal thread 7. A closure piece 8, which is provided with a corresponding external thread, is screwed into this internal thread 7. The through-passage is thus closed, so that no lubricant can flow through the through-passage. A sealing ring 9 seals the space between the flow pipe 6 and the closure piece 8.

At the end face, the closure piece 8 comprises a recess 10, which has a hexagon socket shape, so that the recess can receive a tool so as to screw the closure piece 8 into the flow pipe 6 or unscrew the same from the flow pipe 6.

In the present exemplary embodiment, the flow pipe 6 comprises an external thread 12, onto which a nut 11 having a corresponding internal thread can be screwed. At the end face, the nut 11 ends flush with the closure piece 8. At the other end face of the nut 11, a further sealing ring 13, which in the screwed-on state sealingly ends with a protruding region 14 of the wall 5, is disposed in a recess of the nut 11.

FIGS. 5, 6, 7 and 8 schematically show a section of a pipe union 50 according to an exemplary embodiment of the present invention. The pipe union 50 comprises a first pipe 51 and a second pipe 52, which are connected to one another via a pipe coupling 1 according to the invention, as it is described in FIGS. 1 to 4, for example.

The pipe coupling 1 comprises three injection outlets 2, 3, 4, which are disposed equidistantly across the circumference of the pipe coupling 1. FIG. 6 shows a cross-section through the pipe union 50 at the plane of the injection outlets 2, 3, 4. FIG. 7 shows a longitudinal section along the longitudinal axis L through the pipe union 50. FIG. 8 shows a perspective view. The pipes 51, 52 are connected to the pipe coupling 1 via connecting means 55. In the present exemplary embodiment, the two pipes 51, 52 each comprise a recess 53, 54 at the end faces for each of the three injection outlets 2, 3, 4, the recesses receiving the injection outlets 2, 3, 4 between one another in the connected state. To this end, the two pipes 51, 52 make contact at the end faces. In addition, reference is made to the comments provided for FIGS. 1 to 4.

FIGS. 9, 10, 11 and 12 schematically show a section of a pipe union 90 according to a further exemplary embodiment. FIG. 9 shows a side view of the pipe union 90. FIG. 10 shows a cross-section through the pipe union 90 at the plane of the injection outlets 2, 3, 4. FIG. 11 shows a sectional view of the pipe union 90 along the longitudinal axis X. FIG. 12 shows the pipe union 90 in a perspective view. In principle, reference is made to the comments made with regard to the pipe union 50 from FIGS. 5 to 8. The two pipes 91, 92 are connected via a pipe coupling 1, for example as described in FIGS. 1 to 4. In contrast to the embodiment from FIGS. 5 to 8, the two pipes 91, 92 do not make contact at the end faces when connected, and the pipes 91, 92 thus do not comprise any recesses at the end faces. An insert ring 94, which is disposed inside the pipe coupling 1, is located between the end faces of the pipes 91, 92. The injection outlets 2, 3, 4 are at least partially disposed in the insert ring 94. The end faces of the pipes 91, 92 abut or make contact with the two end faces of the insert ring 94. Toward the inside, the insert ring 94 ends flush with the inner walls of the pipes 91, 92. In addition, reference is made to the comments above.

LIST OF REFERENCE NUMERALS

1 pipe coupling
2, 3, 4 injection outlet
5 wall
6 flow pipe
7 internal thread
8 closure piece
9 sealing ring
10 recess
11 nut
12 external thread
13 sealing ring
14 protruding region
50 pipe union
51, 52 pipe
53, 54 recess
55 connecting means
90 pipe union
91, 92 pipe
93 connecting means
94 insert ring
X longitudinal axis of the pipe coupling
Y lateral axis
Z vertical axis
L longitudinal axis of the injection outlet Having described the invention, the following is claimed:

1. A pipe union comprising:
    a first pipe,
    a second pipe, and
    a pipe coupling, wherein the first pipe is connected to the second pipe by the pipe coupling, said pipe coupling including:
        at least one injection outlet for injecting a lubricant for reducing friction with soil during jacking of the pipe coupling through a tunnel,
        wherein the at least one injection outlet protrudes into an inner circumferential area of the pipe coupling, and the at least one injection outlet is configured to receive lubricant from within the pipe coupling and expel the received lubricant to an outer side wall of at least one of the pipe coupling, the first pipe or the second pipe, and
        wherein the pipe coupling comprises an insert ring, disposed inside the pipe coupling between end faces of the first and second pipes, the first and second pipes connecting to the insert ring at the end faces from both sides, and the at least one injection outlet being at least partially disposed in the insert ring.

2. The pipe union according to claim 1, wherein the at least one injection outlet is disposed in the wall of the pipe coupling, centrally in relation to a longitudinal axis of the pipe coupling.

3. The pipe union according to claim 1, wherein the at least one injection outlet is sealingly introduced into an opening in the wall of the pipe coupling.

4. The pipe union according to claim 3, wherein the at least one injection outlet is sealingly welded and/or sealingly laminated into the opening in the wall of the pipe coupling.

5. The pipe union according to claim 1, wherein the at least one injection outlet ends flush with an outer side of the wall of the pipe coupling.

6. The pipe union according to claim 1, wherein the at least one injection outlet comprises a closure piece for closing the opening of the at least one injection outlet, which is removable for injecting the lubricant so as to expose the opening of the at least one injection outlet.

7. The pipe union according to claim 1, wherein a longitudinal axis of the at least one injection outlet extends perpendicularly to an adjacent region of the wall of the pipe coupling.

8. The pipe union according to claim 1, wherein the at least one injection outlet comprises at least one sealing means for sealing the interior of the at least one injection outlet from an interior of the pipe coupling.

9. The pipe union according to claim 1, wherein the pipe coupling has two or more of said injection outlets, which are distributed across a circumference of the pipe coupling spaced equidistantly apart from each another.

10. The pipe union according to claim 1, wherein the pipe coupling is made of steel.

11. The pipe union according to claim 10, wherein the pipe coupling is made of stainless steel.

12. The pipe union according to claim 1, wherein the insert ring is disposed in the center of the pipe coupling.

* * * * *

UNITED STATES PATENT AND TRADEMARK OFFICE
CERTIFICATE OF CORRECTION

PATENT NO. : 10,612,704 B2
APPLICATION NO. : 15/323842
DATED : April 7, 2020
INVENTOR(S) : Thomas Simoner Page 1 of 1

It is certified that error appears in the above-identified patent and that said Letters Patent is hereby corrected as shown below:

On the Title Page

Item (73) Assignee, Line 1 "Hobas Pipes International GmbH, Klagenfurt (AT)", should read --Amiblu Holding GmbH, Klagenfurt (AT)--.

Signed and Sealed this
Eighteenth Day of August, 2020

Andrei Iancu
*Director of the United States Patent and Trademark Office*